United States Patent [19]

Kowalski

[11] Patent Number: 5,896,468
[45] Date of Patent: Apr. 20, 1999

[54] HEURISTIC SMOOTHING FILTER FOR DIGITAL MAPS

[75] Inventor: Stephen V. Kowalski, Rancho Palos Verdes, Calif.

[73] Assignee: Nortrhop Grumman Corporation, Los Angeles, Calif.

[21] Appl. No.: 08/562,657

[22] Filed: Nov. 27, 1995

[51] Int. Cl.⁶ .............. G06K 9/20; G06K 9/36; G06K 9/34

[52] U.S. Cl. .......... 382/264; 382/180; 382/262; 382/265; 382/282; 348/597

[58] Field of Search ................ 382/114, 180, 382/261, 262, 264, 265, 171, 172, 242; 348/597

[56] References Cited

U.S. PATENT DOCUMENTS

| | | | |
|---|---|---|---|
| 4,783,839 | 11/1988 | Bamber | 382/54 |
| 4,984,279 | 1/1991 | Kidney et al. | 382/1 |
| 5,038,378 | 8/1991 | Chen | 382/1 |
| 5,081,691 | 1/1992 | Chesley | 382/54 |
| 5,197,108 | 3/1993 | Watanabe | 382/47 |
| 5,202,935 | 4/1993 | Kanamori et al. | 382/54 |
| 5,218,649 | 6/1993 | Kundu et al. | 382/54 |
| 5,266,805 | 11/1993 | Edgar | 250/330 |
| 5,271,064 | 12/1993 | Dhawan et al. | 382/54 |
| 5,280,367 | 1/1994 | Zuniga | 382/171 |
| 5,287,418 | 2/1994 | Kishida | 382/50 |
| 5,293,579 | 3/1994 | Stockholm | 382/22 |
| 5,317,644 | 5/1994 | Kenyon et al. | 382/6 |
| 5,486,686 | 1/1996 | Zdybel, Jr. et al. | 235/375 |
| 5,537,494 | 7/1996 | Toh | 382/242 |

*Primary Examiner*—Leo H. Boudreau
*Assistant Examiner*—Daniel G. Mariam
*Attorney, Agent, or Firm*—Terry J. Anderson; Karl J. Hoch, Jr.

[57] ABSTRACT

Digital maps digitized by scanning paper maps are smoothed by identifying regions which should be of a uniform color, empirically selecting sets of colors which the pixels of a given region might have in the raw map, empirically determining the statistical probability of occurrence of pixels of each color of the selected set in the region, defining groups of connected pixels having colors within the selected set, and resetting the color of all the pixels in a group to a predetermined region color if, and only if, the pixels of the group satisfy the determined statistical probability of occurrence. The inventive method provides uniform coloring of the map where desired, without affecting the sharpness of small-print map annotations.

10 Claims, 5 Drawing Sheets

| 2 | 2 | 3 | 6 | 3 | 6 |
|---|---|---|---|---|---|
| 3 | 3 | 5 | 4 | 4 | 2 |
| 2 | 6 | 5 | 1 | 1 | 3 |
| 6 | 5 | 4 | 5 | 5 | 8 |
| 2 | 1 | 1 | 7 | 9 | 9 |
| 3 | 6 | 7 | 7 | 1 | 5 |

*FIG. 6a*

| 0 | 0 | 0 | 0 | 0 | 0 |
|---|---|---|---|---|---|
| 0 | 0 | 1 | 1 | 1 | 0 |
| 0 | 0 | 1 | 1 | 1 | 0 |
| 0 | 1 | 1 | 1 | 1 | 0 |
| 0 | 1 | 1 | 0 | 0 | 0 |
| 0 | 0 | 0 | 0 | 1 | 1 |

*FIG. 6b*

|  |  |  |  |  |  |
|---|---|---|---|---|---|
|  | A | A | A |  |  |
|  |  | A | A | A |  |
|  | A | A | A | A |  |
|  | A | A |  |  |  |
|  |  |  |  | B | B |

*FIG. 6c*

| 2 | 2 | 3 | 6 | 3 | 6 |
|---|---|---|---|---|---|
| 3 | 3 | 5 | 5 | 5 | 2 |
| 2 | 6 | 5 | 5 | 5 | 3 |
| 6 | 5 | 5 | 5 | 5 | 8 |
| 2 | 5 | 5 | 7 | 9 | 9 |
| 3 | 6 | 7 | 7 | 1 | 5 |

*FIG. 6d*

HEURISTIC SMOOTHING FILTER FOR DIGITAL MAPS

FIELD OF THE INVENTION present invention relates generally to the production of digital maps, and more particularly to a heuristic smoothing filter for improving the appearance, clarity and compressed size of digital maps generated by scanning printed paper maps.

BACKGROUND OF THE INVENTION

A number of systems have been developed in recent years, mostly for military and transportation industry purposes, which involve the electronic projection, on a screen located in a vehicle or aircraft, of a map showing relevant information regarding the area in which the vehicle or aircraft is traveling. Such maps are known as digital maps because they are composed, like a video image, of a large number of pixels whose color is digitally encoded.

Digital maps are conventionally produced by scanning printed paper maps to generate a digital electronic image of the paper map. The quality of the digitization is adversely affected by a variety of factors relating to the printing and scanning process. These factors are principally the following:

a) The paper map has defects introduced by the printing process (e.g. uneven inking or ink smears).

b) Noise is introduced by the scanning process. In other words, the color that is sampled for a pixel will not be completely accurate.

c) When the paper map is printed, some regions are represented by numerous small dots of similar or different colors. On physical paper maps, these regions appear to the eye as being of a single solid color, but they show up as noise when digitized.

The limited quality of the digitization causes two principal problems when the digitized data is imaged on a computer monitor:

a) the map appears noisy on the screen, especially on a close-in zoom. For example, an ocean area, which one would expect to be solid blue, appears on the screen as several different shades of blue with white dots scattered in regular patterns.

b) The compression efficiency is decreased. These maps take up considerable room on the computer's hard disk, so it is desirable to compress them as much as possible. The more uniformly colored the map is, the more it can be compressed.

Consequently, although the prior art digital maps have proven generally suitable for their intended purposes, they possess inherent deficiencies which detract from their overall effectiveness.

The prior art has attempted to solve this problem by traditional image smoothing methods using, for example, averaging or interpolating techniques which work well on "real" images such as scenes. These methods, however, can have undesirable side effects when used on "artificial" images such as maps, because they tend to blur fine-print annotations which are a vital component of maps.

It is thus desirable to provide a way to smooth out the noisy appearance of the imaged map, and to so modify it as to maximize its compressibility, yet without degrading the map annotations. Although this is a well recognized problem, the proposed solutions have, to date, been ineffective in providing a satisfactory remedy.

SUMMARY OF THE INVENTION

The present invention specifically addresses and alleviates the above-mentioned deficiencies associated with the prior art. More particularly, the present invention provides a computerized way of identifying regions that should be represented by one solid color, and then digitizing all of each identified region in its appropriate color. This approach gives uniform areas a uniform color which makes the image data easy to compress, yet does not affect the appearance or resolution of map annotations.

A preferred embodiment of the invention carries out this approach by providing a heuristic filter, i.e. an algorithm which examines the image, heuristically determines which pixels are likely to be part of a given region, and then sets all of these pixels to the color value of that region.

More specifically, the heuristic method used by the invention to identify pixels belonging to a given region involves the following steps: first, a predetermination is made as to what colors pixels of the raw image belonging to the region could have (i.e. ocean pixels could be blue, pale blue, or white, but could not have the annotation colors of, e.g., purple or black; city pixels could be green, yellow, or yellowish-green, but not purple or black; forest pixels could be green, bluish-green, or brownish-green, but again not purple or black). Next, in a preferred embodiment of the invention, a binary image of the map is created in which all pixels in the binary image that have one of the possible colors of a given region are set to a specific value, e.g. logic "1", while all the other pixels of the binary image are set to another value, e.g. logic "0".

Each group of logic "1" pixels that are adjacent to each other in the binary image are then defined as connected components of the image. Each component is then separately examined in the raw image with another heuristic formula which evaluates the relative percentages of pixels in the component which have the various possible colors. If the relative percentages satisfy a predetermined heuristic rule, all pixels of the component are declared to be part of the region and are set to the predetermined attribute (i.e. color or shade) of the region. The other pixels in the raw image are left unchanged.

It will be seen that the process of this invention can never affect annotation pixels because annotation pixels are either the wrong color for the region and cannot become part of a component, or they are the right color but belong to components that have the wrong statistical color distribution and are therefore not recognized as being part of the region. Consequently, the annotations remain as sharp in the processed image as the pixel resolution will inherently allow.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIGS. 6a–d are matrix diagrams illustrating the pixel processing steps of this invention.

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
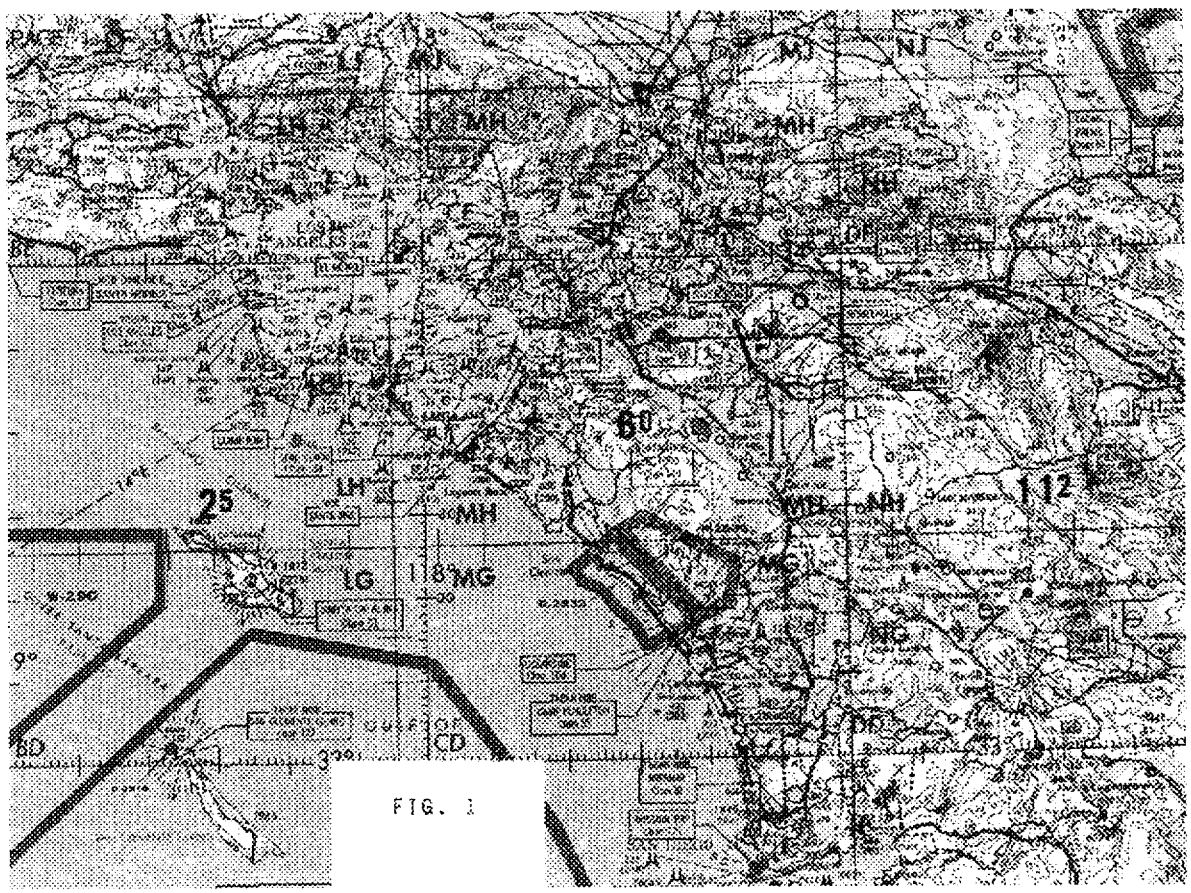
FIG. 1 is a representative digital aeronautical navigation chart produced by conventional methods.
Figure 2:
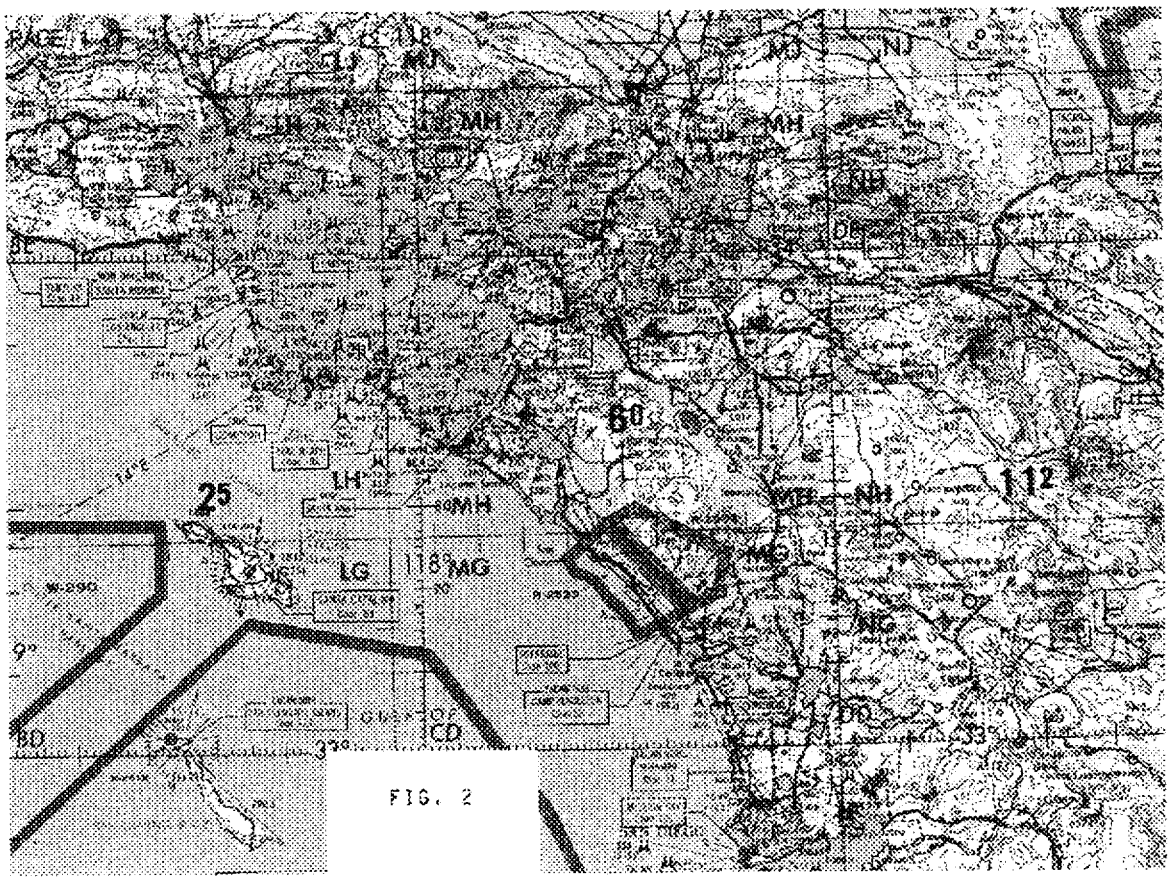
FIG. 2 is the same chart as FIG. 1 but produced by the method of this invention.

The environment in which the invention operates, and the effect of the invention, are illustrated in FIGS. 1 and 2. FIG. 1 is an aeronautical navigation chart of the Southern California coastal area digitized by conventional scanning methods from a printed color chart issued by the United States Government.

Inspection of FIG. 1 reveals that the scanning process has reproduced the uniform bright yellow city areas of the original paper chart in irregularly varying shades of greenish-yellow, and that the ocean appears to be permeated by concentric bluish-white wave lines. These artifacts are the result of noise introduced by the scanning process.

Figure 3:
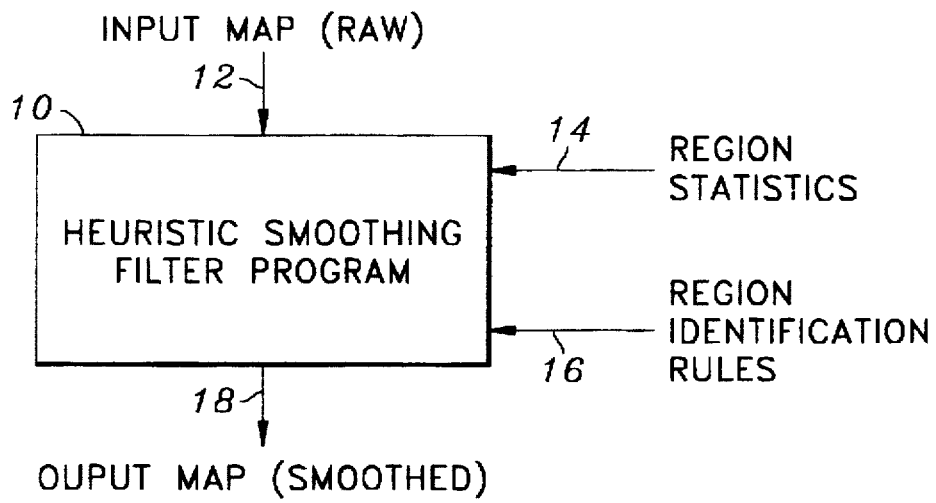
FIG. 3 is a block diagram illustrating the overall apparatus of the preferred embodiment of the invention.

FIGS. 3 through 6d illustrate the inventive process by which the raw digitized chart of FIG. 1 is transformed into the smoothed digitized chart of FIG. 2. In FIG. 3, 10 designates the heuristic smoothing filter program of this invention. There are three inputs to the program 10: the raw input map 12 (i.e. the digital representation of the chart of FIG. 1); the predetermined region statistics 14; and the predetermined region identification rules 16. The output of the program 10 is the smoothed output map 18 (i.e. the digitized version of the chart of FIG. 2).

The region statistics 14 are selectable parameters by which the operator instructs the program as to which color or set of colors represents ocean, city areas, or other regions which are to be smoothed, i.e. in which a uniform color is called for. The region identification rules 16 are conditional tests on the region statistics 14 to determine if a region is of the type to be smoothed. The parameters for the region statistics 14 may be determined by the operator following analysis of representative areas known to be part of a region to determine a range of relative color percentages in a given group of adjacent pixels that should be interpreted as, e.g., ocean instead of legend.

Both the region statistics 14 and the region identification 16 could, of course, be determined empirically by electronically analyzing representative legend-free areas in the digitized raw map 12 shown in FIG. 1.

Figure 4:
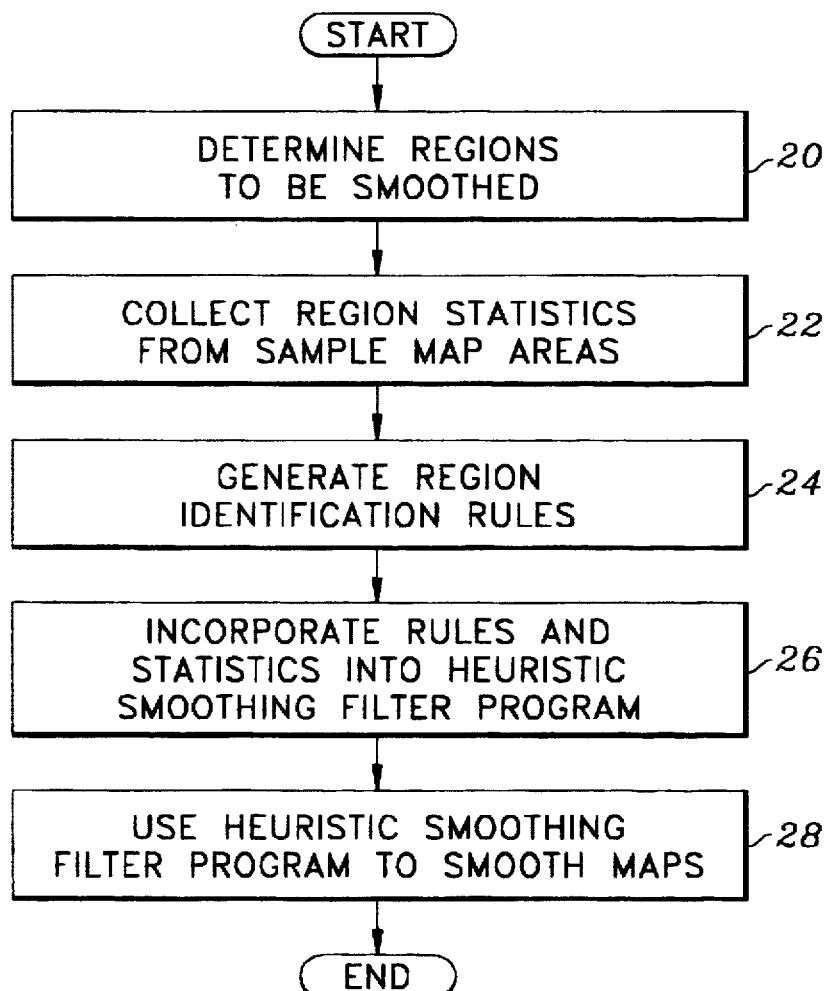
FIG. 4 is a flow chart illustrating the major parts of the heuristic program used in the preferred embodiment.
Figure 5:
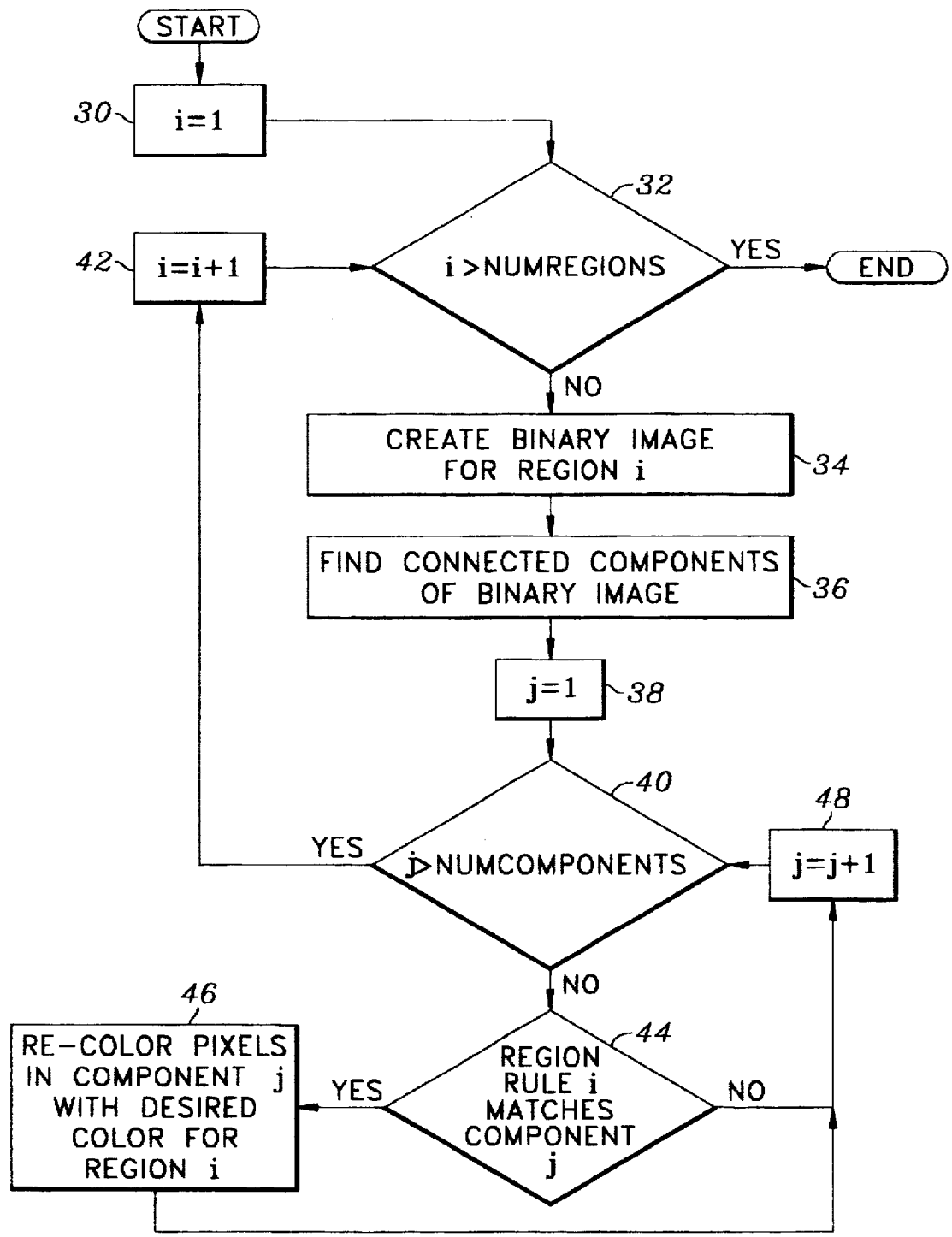
FIG. 5 is a detailed flow chart of the heuristic program of FIG. 4.

FIG. 4 illustrates in broad terms the sequence of operations involved in carrying out the invention. As shown by box 20, the first step is to determine which regions should be smoothed. For example, in FIG. 1, the blue ocean, the yellow city areas, the green valley areas and the ochre high mountain areas make up a large portion of the map and are good candidates for smoothing.

Having determined which regions are to be smoothed, the next step is shown in box 22 as being the collection of region statistics 14, as described above, from sample areas of each affected region. This is followed by the generation (box 24) of region identification rules 16 as described above. Finally, the region statistics 14 and region identification rules 16 are loaded into the program 10 (box 26), and the program 10 is run (box 28).

FIGS. 5 and 6a–d illustrate the operation of the program 10. The program begins by setting a variable i to the value 1 at 30. If no regions have been determined in step 20, the conditional branch 32 ends the program. Otherwise, the program begins the construction of a binary image for Region 1 (box 34). How this is done is illustrated in FIGS. 6a and 6b.

FIG. 6a shows a representative 6×6 pixel section of the image of FIG. 1. For purposes of illustration, it will be assumed that each pixel of the FIG. 1 image has one of nine predetermined colors. For example, if Region 1 is city, the possible pixel colors for city areas in the raw image of FIG. 1 are green (color 1), red (color 4), or yellow (color 5). The correct color for Region 1 is yellow (color 5).

The program 10 examines the image 6a pixel by pixel and produces a binary image 6b in which any pixel of FIG. 6a whose color is 1, 4 or 5 is represented by a "1", and pixels of any other color are represented by a "0". Thus, in the total image, the "1" pixels may belong to Region 1, while the "0" pixels definitely do not.

The program now proceeds at 36 to determine the connected components of the binary image of FIG. 6b. As shown in FIG. 6c, the program identifies two connected components A and B of "1" pixels, i.e. two groups of "1" pixels in which each pixel of the group is immediately adjacent another pixel of the group.

At this point, a variable j is set to 1 at 38. In the unlikely event that there are no connected components in the binary image, the conditional branch 40 increments i by 1 and returns to the conditional branch 31 for evaluation of the next region. Otherwise, the program 10 examines, at conditional branch 44, the component A (which corresponds to j=1) to determine whether component A satisfies the region statistics for Region 1.

The region statistics are typically expressed in terms of relative percentages of the possible pixel colors. For example, the collection in step 22 of statistics from samples of known city areas in the image of FIG. 1 may have determined that a connected component can be deemed part of Region 1 if it consists of more than 40% of color 5, more than 20% of color 4, and more than 30% of color 1.

An examination of FIG. 6a shows that the twelve pixels of component A include five color 5 pixels (42%), three color 4 pixels (25%), and four color 1 pixels (33%). Consequently, component A satisfies the Region 1 statistical criteria and is therefore part of Region 1. This being the "yes" branch of conditional branch 44, all the pixels of component A are thereupon set to color 5 (the "official" color of Region 1) at 46, while the other pixels in the image remain unaffected (FIG. 6d).

The variable j is now incremented by 1 at 48, and the component B (FIG. 6c) is examined. Component B, however, contains no color 4 pixels, and therefore fails to satisfy the Region 1 statistical criteria. Consequently, the "no" branch of conditional branch 44 returns the program 10 directly to 48, and the pixels of component B remain unaffected (FIG. 6d).

The incrementation of j at 48 makes j greater than the number of components in the image of FIGS. 6a–d, and the conditional branch 40 returns the program to 42, where i is incremented to 2, and the conditional branch 32 begins the construction of Region 2. Eventually, after all the regions to be smoothed have been constructed, the incrementation of i makes i greater than the number of regions to be smoothed, and the conditional branch 32 ends the program 10. At this time, the statistically identified pixels of all the smoothed regions have been reset to their proper values, and the digital image is now the smoothed image of FIG. 2. Consequently, the image of FIG. 2 is uniform and clear, and is capable of remaining so even under considerable close-in zoom. Those skilled in the art will recognize that it is preferable to run the program 10 sequentially on successive small pixel matrices of the FIG. 1 image, such as those shown in FIGS. 6a–d. The reason for this is that if the examined pixel matrix is too large, the inclusion of, small discontinuities (e.g., blue legend pixels in a group of blue ocean pixels) may not change the statistical make-up of that group enough to prevent it from being interpreted as part of the ocean region and wiping out the legend pixels.

Likewise, it will be understood that the production of a binary image as described herein is convenient but not necessary. Other algorithms or routines capable of identifying connected components may equally well be used. In general, the exemplary heuristic smoothing filter described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

I claim:

1. A method of smoothing a digitized image of a map, comprising the steps of:
   a) providing a raw digitized image;
   b) defining discrete regions in said image to be smoothed by selecting for each region a predetermined number of possible attributes which pixels of said raw image can have in that region;
   c) gathering, from sample areas of said raw image known to be in said region, statistical information regarding the relative frequency of occurrence of pixels having said possible attributes in said sample areas;
   d) identifying in said raw image those pixels which have one of said attributes selected for said region;
   e) defining in said raw image connected components of said regions composed of groups of said identified pixels in which said identified pixels are immediately adjacent to one another;
   f) determining whether the pixel distribution in each defined component is substantially consistent with said gathered statistical information; and
   g) resetting all pixels in components which are consistent with said statistical information to a desired attribute of said region.

2. The method of claim 1, in which said component definition step includes the step of producing a binary image in which all pixels having one of said possible attributes are set to one binary value, and all other pixels of the image are set to the other binary value.

3. The method of claim 1, in which said attributes are colors.

4. A heuristic smoothing filter program embodied in a tangible medium for smoothing a raw digitized image for digital maps, comprising:
   a) a first input arranged to receive and store digital data representing pixels of said raw image, said raw image containing regions to be smoothed;
   b) a second input arranged to receive and store data representing, for each of said regions, attributes needed for a pixel to potentially be a part of that region;
   c) a third input arranged to receive and store data representing, for each of said regions, statistical parameters needed for a group of connected potential pixels to actually be a part of said region;
   d) a computation routine arranged to identify in said raw image, for each of said regions, pixels having said attributes for potential inclusion in said region; to identify as components of said region those groups of connected potential pixels which are consistent with said statistical parameters; and to modify the attribute of each pixel in each so identified component to conform to a selected attribute representative of said region; and
   e) an output arranged to put out digital data representing pixels of said smoothed image, said output pixels being the pixels of said raw image as modified, where applicable, by said computation routine.

5. The program of claim 4, in which said computation routine includes a subroutine arranged to produce a binary image in which all pixels having one of said potential attributes for said region are modified to have a first binary value, and all other pixels of said raw image are modified to have another binary value, said components being defined as those groups of connected pixels in said raw image that correspond to those connected pixel groups of said binary image in which all pixels have said first binary value.

6. The program of claim 4, in which said attributes are colors.

7. A heuristic smoothing filter program embedded in a tangible medium for smoothing a raw digitized image for digital maps, comprising the functions of:
   a) providing
      i) a raw digital image having regions therein;
      ii) identification data for identifying each of said regions, and
      iii) statistical data pertinent to each of said regions;
   b) setting a region count;
   c) identifying those pixels which have an attribute consistent with said identification data for a first of said regions if said region count is not greater than the number of said regions, but ending said program if said region count exceeds the number of said regions;
   d) identifying in said raw image components consisting of connected ones of said consistent-attribute pixels;
   e) setting a component count;
   f) determining whether the attributes of the pixels within a first of said components are consistent with said statistical data if said component count is not greater than the number of said so identified components, but incrementing said region count and repeating steps b) through h) for each of the remaining regions if said component count exceeds the number of identified components;
   g) modifying the attribute of each of said first component pixels to conform to a selected attribute representative of said region, and then incrementing said component count, if the attributes of said first component pixels are consistent with said statistical data, but incrementing said component count directly if said attributes are not so consistent; and h) repeating steps f) and g) for each of the remaining components.

8. The program of claim 7, in which said attributes are colors.

9. A method of producing a smooth digital image from a printed map in which areas of visually uniform color are composed of juxtaposed pixels of different colors, comprising the steps of:

a) digitizing said printed map;

b) defining regions of said printed map in which color should be uniform;

c) selecting for each region a set of colors which individual pixels of that region can have;

d) gathering, from sample areas of known color, statistical information regarding the relative frequency of occurrences of pixels in said sample area that have a given color of said set;

e) identifying, in each region of said digitized map, those pixels which have one of the colors of said set;

f) defining in said digitized map components made up of groups of immediately adjacent pixels thus identified;

g) determining, for each component thus defined, whether the pixel color distribution within said component is substantially consistent with said statistical information; and h) resetting all pixels in each of said components determined to be thus consistent to a desired color for that region.

10. The method of claim 9, in which said component definition step includes the step of producing a binary image in which all pixels of said region having a color of said set are set to one binary value, and all other pixels of said region are set to the other binary value.

* * * * *